United States Patent
Pollard et al.

(10) Patent No.: US 7,949,182 B2
(45) Date of Patent: May 24, 2011

(54) COMBINING DIFFERENTLY EXPOSED IMAGES OF THE SAME OBJECT

(75) Inventors: Stephen Pollard, Dursley (GB); Andrew Hunter, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1060 days.

(21) Appl. No.: 11/627,305

(22) Filed: Jan. 25, 2007

(65) Prior Publication Data

US 2008/0180749 A1    Jul. 31, 2008

(51) Int. Cl.
    *G06K 9/00*    (2006.01)
    *G03F 3/08*    (2006.01)
(52) U.S. Cl. .................... 382/167; 382/162; 358/518
(58) Field of Classification Search .................. None
    See application file for complete search history.

(56) References Cited

U.S. PATENT DOCUMENTS

| 6,078,357 | A  | * | 6/2000 | Yamamoto et al. | 348/234 |
| 7,158,687 | B2 | * | 1/2007 | Ohno | 382/274 |
| 2003/0234944 | A1 | * | 12/2003 | Gindele | 358/1.9 |

OTHER PUBLICATIONS

"Morphology". pp. 518-525.

* cited by examiner

*Primary Examiner* — Anand Bhatnagar
*Assistant Examiner* — Randolph Chu (57) ABSTRACT

An image processing system includes: an image capture device operable to capture at least first and second images of an object at different exposures, a storage for at least part of the at least first and second images, a filter for splitting the at least first and second images into respective first and second spatial frequency components, the first frequency component being of lower frequency than the second, a selector for selecting local image intensity data from the second spatial frequency components of a region of the at least first and second images for combination with the first frequency component from the corresponding region of the first image, and a combiner for combining the selected local image data from the second spatial frequency components of the at least first and second images with the first spatial frequency component of the first image to form a final image.

20 Claims, 6 Drawing Sheets

COMBINING DIFFERENTLY EXPOSED IMAGES OF THE SAME OBJECT

BACKGROUND INFORMATION

Many every day scenes contain a high range of intensities of light. When capturing an image of a scene, the range of intensities is often greater than the dynamic range of an image capture device. It is therefore often impossible to capture a sufficient tonal range in an image without suffering from excessive noise, particularly in dark areas of the image.

One method of overcoming this problem is to obtain multiple images of different exposures on an image capture device with low dynamic range and to combine these images to form a single higher dynamic range image. For example in U.S. Pat. No. 6,040,858 an expanded dynamic range is achieved by replacing an image signal with a proper signal in saturated or noise regions. The proper signal coming from a different exposure to the image signal.

Another method of increasing the dynamic range of an image obtained from a low dynamic range imaging device is to spatially vary the exposure of a scene. For example in U.S. Pat. No. 6,864,916 a high dynamic range image is produced using a low dynamic range sensor. The image of the scene is captured with an image sensor using a spatially varying exposure function. This can be done in a number of ways such as using an optical mask or by using an array of light sensing elements having spatially varying photosensitivies.

There are a number of problems with the prior art methods of increasing dynamic range. The combination of differently exposed images or image portions can result in loss of continuity of tone. Motion of an object in the scene between the different exposures can cause alignment problems when recombining the images. Further the recombination of the images can have substantial computational cost in terms of processing requirements.

Additionally spatially varying the exposure of a scene involves additional hardware and/or complex sensor modifications. These are expensive and can limit other aspects of the optical system such as the pixels size of the sensor or the volume of the optical system.

SUMMARY OF THE INVENTION

In accordance with an embodiment of the present invention, there is provided an image processing system. The system comprises an image capture device operable to capture at least first and second images of an object at different exposures, storage for at least part of the captured images, a filter for splitting the images into respective first and second spatial frequency components, the first frequency component being of lower frequency than the second. The image processing system further comprises a selector for selecting local image intensity data from the second spatial frequency components of a region of the images for combination with the first frequency component from the corresponding region of the first image. The image processing system further comprises a combiner for combining the selected local image data from the second spatial frequency components of the images with the first spatial frequency component of the first image to form a final image.

Embodiments of the present invention are particularly advantageous because all of the low frequency of the final image comes from a single image, the tone of the combined image will match the tone of that image. Further, because the majority image noise is contained in the high spatial frequency component, selecting the low frequency from the shorter exposure will not affect the noise level of the final image.

According to an embodiment of the present invention, the high frequency components for inclusion in the final image can be selected by comparing an image intensity measure with a first threshold. This allows the high frequency component of the final image to be selected from the first image in areas where the second image is saturated.

According to another embodiment of the present invention the high frequency components for inclusion in the final image are selected by comparing the low frequency components of the second image with a threshold. This allows the high frequency component of the final image to be selected from the first image in areas where the second image is saturated.

According to another embodiment of the present invention, the high frequency components of the final image can be selected by comparing the total image intensity of an area of the image with a threshold.

According to another embodiment of the invention the image capture system comprises a scanner. This embodiment of the invention has the particular advantage that when used to scan a photographic negative, because the tone of the image comes from the low frequency a single scan, the tone curve of the negative is preserved.

According to another embodiment of the invention a method for combining at least first and second differently exposed images of an object to form a final image is provided. The method comprises splitting the differently exposed images into first and second spatial frequency components, the first spatial frequency component having a lower spatial frequency than the second. The method further comprises selecting local second spatial frequency components from the at least first and second images for combination with the first spatial frequency components of the first image, and combining the selected second spatial frequency components with the local first spatial frequency components of the first image to form a final image.

According to another embodiment of the present invention, the high frequency components are selected for the final image by comparing the high frequency components of the first and second images, the second image being scaled to account for the difference in exposure times. This embodiment has the advantage that if there is any movement of the object between the capture of the images, the high frequencies are selected from the first image, so alignment problems will be avoided.

Consistent with a further embodiment of the invention a computer program product containing instructions for the combination of differently exposed images of the same object is provided. The instructions comprise splitting the images into first and second spatial frequency components, and selecting local second spatial frequency components from the differently exposed images for combination with the first spatial frequency components of the first image. The instructions further comprise combining the selected second spatial frequency components with the first spatial frequency components of the first image to form a final image.

BRIEF DESCRIPTION OF THE DRAWINGS

In the following embodiments of the invention will be described, by way of example only, and with reference to the drawings in which.

DETAILED DESCRIPTION

Systems and methods consistent with the present invention can provide a means for capturing a high dynamic range image from an object using a low dynamic range image capture device.

Figure 1:
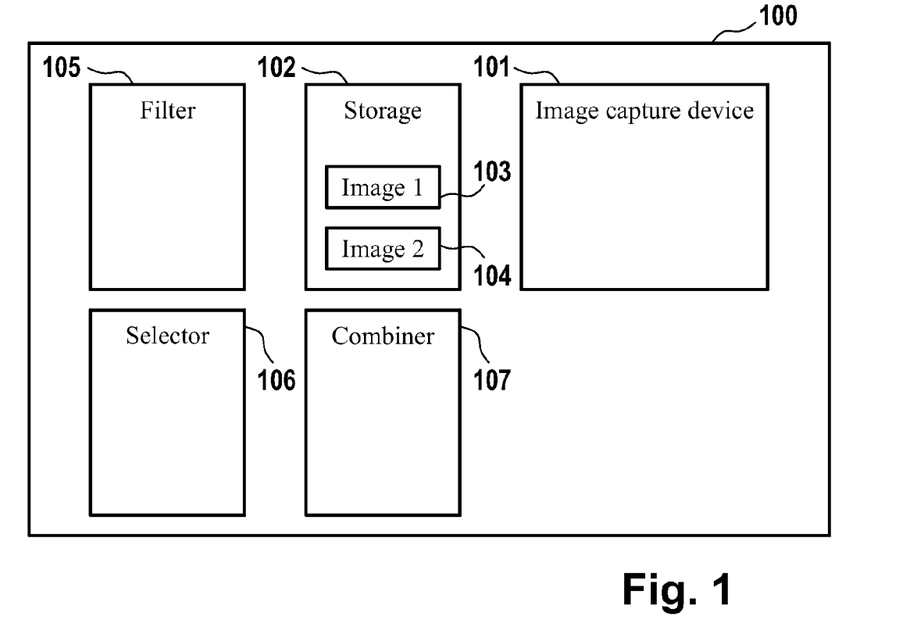
FIG. 1 is a block diagram of an image processing system according to an embodiment of the present invention.

Referring now to FIG. 1 an exemplary image processing system 100 is shown. The image processing system comprises an image capture device 101 which is operable to capture images of an object, the images having different exposures. The image processing system 100 further comprises storage 102 for at least part of the captured images 103 and 104. The image processing system further comprises a filter 105. The filter 105 is capable of splitting the captured images into high and low spatial frequencies. The image processing system further comprises a selector 106 for selecting high frequency components of the first and second images for combination with the low frequency component of the first image. The selected high frequency component is then combined with the low frequency component of the first image in the combiner 107.

Figure 2:
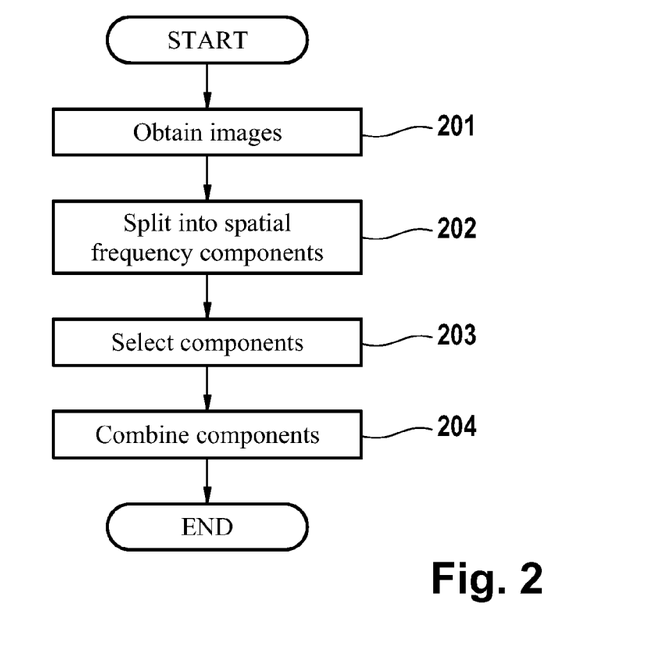
FIG. 2 is a flow diagram illustrating steps involved in a method for combining differently exposed images of the same object according to an embodiment of the present invention.

FIG. 2 shows a method of combining differently exposed images of an object to form a final image of the object. In step 201, the images are obtained this can involve loading the images or importing the images from an image capture device. In step 202, the images are split into high and low spatial frequency components. In step 203, high frequency components from either of the images are selected for combination with the low spatial frequency components of the first image. In step 204, the selected components are combined to form a final image.

The image capture device can be a digital camera, a scanner, or another device capable of converting the intensity of light into an electrical signal. In a digital camera, the different exposures can be obtained by varying the time for which the sensor on the camera is exposed. The different exposures can also be obtained by varying the aperture on the camera, and by varying the illumination of the scene, for example by using one exposure without a flash and one with a flash. On a scanner, the different exposures can be obtained by varying the exposure time, or by varying the intensity of a light source in the scanner. The stored images can be stored as a number of intensities for individual color channels for pixels in the images.

The processing of the images can take place after both of the images have been obtained. Alternatively the processing of the second image can take place during the image capture process, with areas of the second image being filtered and selected for inclusion in the final image as they are obtained from the image capture device. Another alternative is that the data of the first and second images are obtained together, and then processed together. For example the, image capture device can be an LED based scanner having a number of different color LEDs and a single monochrome sensor. In such a device the color channels for a point on an image are exposed in sequence, it would therefore be possible to obtain a second set of color channel data for the same point having a different exposure. This would reduce the storage required as only part of the first and second images would need to be stored.

Figure 3:
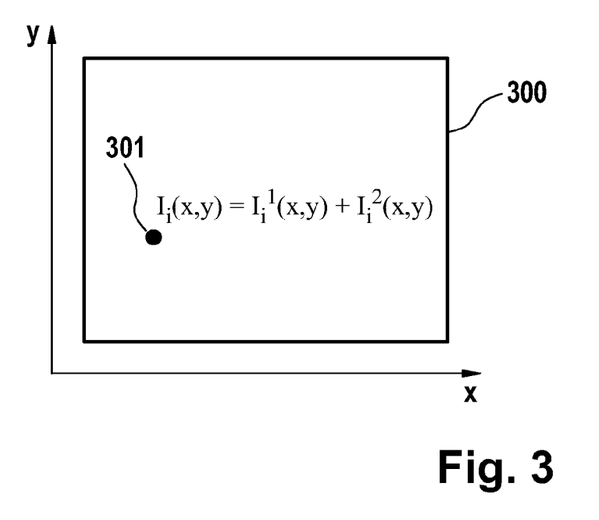
FIG. 3 illustrates an exemplary image according to an embodiment of the present invention.

FIG. 3 shows an example of an image 300, the coordinates x and y indicating a position 301 on the image. At position 301, the total intensity can be expressed as $I_i(x,y)$. This can be expressed as the sum of a low frequency component $I_i^1(x,y)$ and a high frequency component $I_i^2(x,y)$. In the following $I_1^1(x,y)$, and $I_1^2(x,y)$ are used to refer to the low and high frequency components of a position on a first image. $I_2^1(x,y)$, and $I_2^2(x,y)$ are used to refer to the low and high frequency components of a position on a second image, the second image having a longer exposure than the first.

The captured image can be split into high and low spatial frequencies using a Gaussian filter to extract the low spatial frequencies. The high frequencies can then be obtained by a pixel by pixel subtraction of the low frequencies from the original image.

The high frequency component of the second image can be scaled when it is included in the final image to account for the difference in exposure between the first and second images. This can be achieved by multiplication by a scaling factor. The scaling factor can be a ratio of the first and second exposure values, alternatively it can be a ratio of the illumination or flash incident on the different exposures. However, the sensitivity of sensors in the image capture device can not be entirely linear. This can result in a mismatch between scaled intensity levels. It is also possible that the illumination level of the object can change during and more significantly between image captures. In order to overcome these problems a local scaling factor can be calculated from the ratio of the low frequency components of the first and second images.

The selection of local high frequency components for the final image can involve a comparison of the difference between the high frequency component of the first image and the scaled high frequency component of the second image with a threshold. If the difference is greater than the threshold then the high frequency component of the first image is used in the final image, but if the difference is lower than the threshold then the scaled high frequency component of the second image is used in the final image. This method is repeated over the whole area of the final image.

Because the high frequency component from the second image comes from a longer exposure, it contains less noise, therefore it is often advantageous to use the high frequency component from the long exposure. However in regions where there is saturation of the signal in the longer exposure, or where the object has moved between scans, it is advantageous to use the high frequency component from the short exposure.

Figure 4:
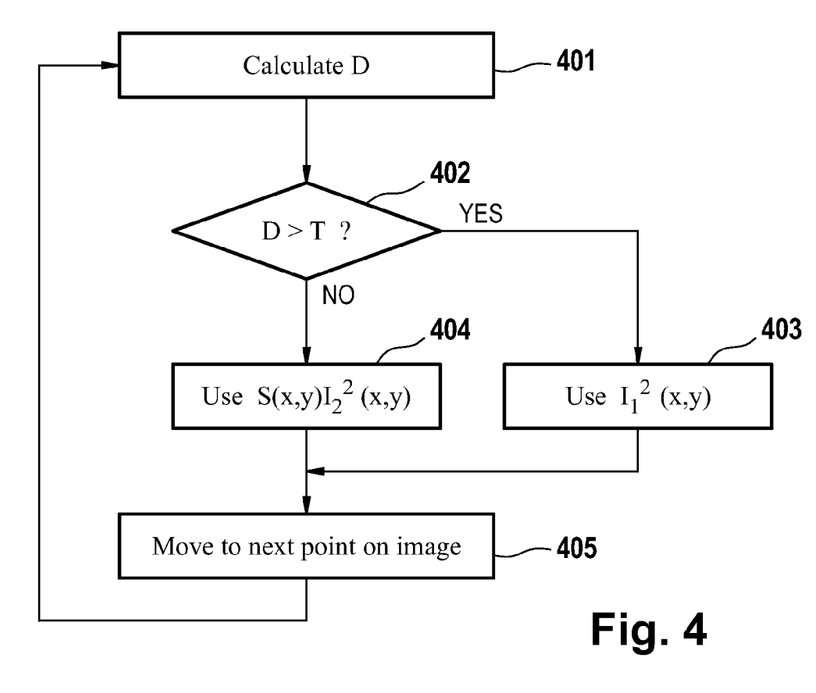
FIG. 4 is a flow diagram illustrating steps involved in a method of selection of high frequency components using comparison of high frequency components according to an embodiment of the present invention.
Figure 5:
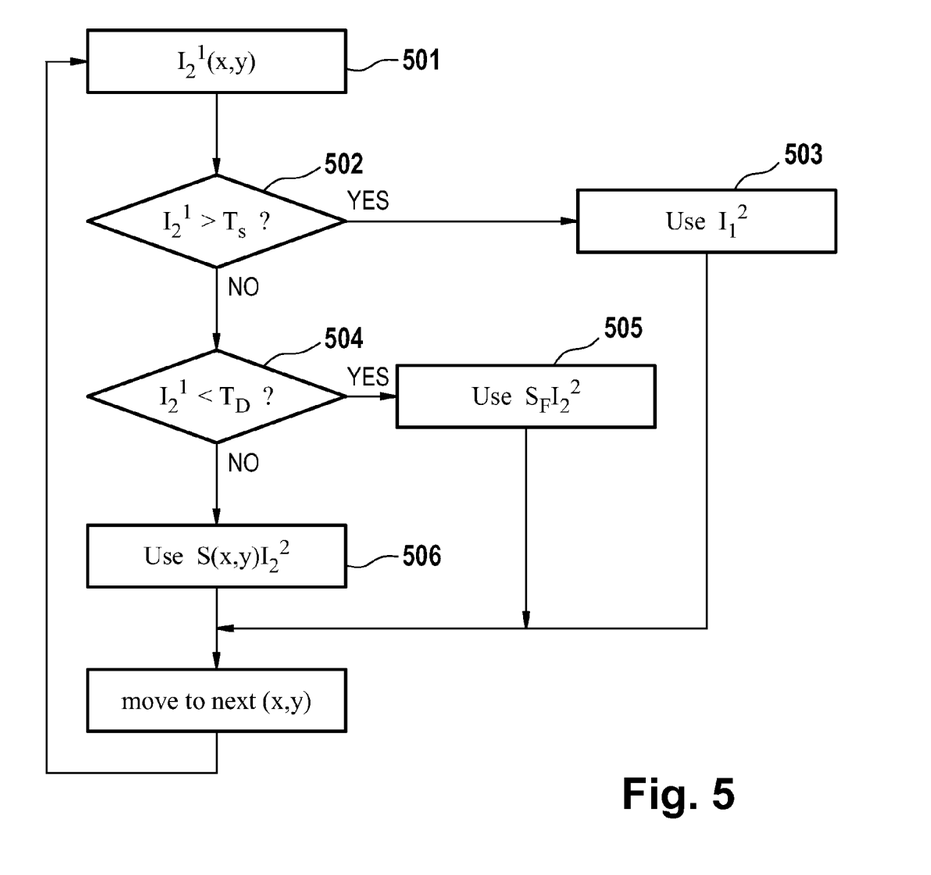
FIG. 5 is a flow diagram illustrating steps involved in a method for selection of high frequency components using a comparison of low frequency components according to an embodiment of the present invention.

FIG. 4 shows a method of selection of local high frequency components for a point on the final image by comparing the high frequency components of the first and second images for the same point on the image. Step 401 involves calculating the difference, D between the high frequency component of the first image and the scaled high frequency component of the second image. In step 402 the difference is compared with a predefined value, T. If the difference is greater than the predefined value, then in step 403 the high frequency component $I_1^2(x,y)$ from the first image is used. If the difference is less than the predefined value T, then the scaled high frequency component $S(x,y)I_2^2(x,y)$ from the second image is used (step 404). In step 405, the process is restarted for the next point on the image FIG. 5 shows a method which can be used for selection of high frequency components in the final image using an analysis of the low frequency component of the second image. The method involves a comparison of the local low frequency component of the second image with a number of thresholds. In step 501, the low frequency component of the second image is obtained. In step 502, the low frequency component is be compared with a saturation threshold $T_S$. If the low frequency component is greater than this threshold then it is likely that the high frequency signal of the second image will be clipped by saturation of the signal in the long exposure so the high frequency component from the short exposure is used in the final image in step 503.

Following comparison with the saturation threshold, $T_S$, a comparison with a dark threshold, $T_D$ can take place in step 504. The comparison with the dark threshold takes place in order to account for the fact that in very dark regions the scaling factor can be inaccurate. Therefore in regions where the low frequency component of the second image is below the dark threshold, $T_D$, a fixed scaling factor $S_F$ is used (step 505). Alternatively the high frequency component from the first image can be used. In areas of the image where the low frequency component of the longer exposure is between the two thresholds the scaled high frequency component of the second image can be used. Where the low frequency component of the second image is between the two thresholds, the position dependant scaling factor $S(x,y)$ calculated from the ratio of the low frequency signals can be used (step 506).

Alternatively the comparison can take place between the local total second image intensity, $I_2(x,y)$ and either or both of the saturation and dark thresholds described above. The thresholds $T_S$ and $T_D$ can take different values to account for the fact that the comparison is with the total second image signal.

The high and low frequency signals of the first and second signals can comprise a number of color channels. The comparison with the thresholds described can take place between the sum of all the color channels for a given location on the image, or the comparison can take place with the locally strongest of the color channels. Alternatively the comparison can be specific to each channel using just the color information for each channel at each location on the image to update that color channel.

Figure 6:
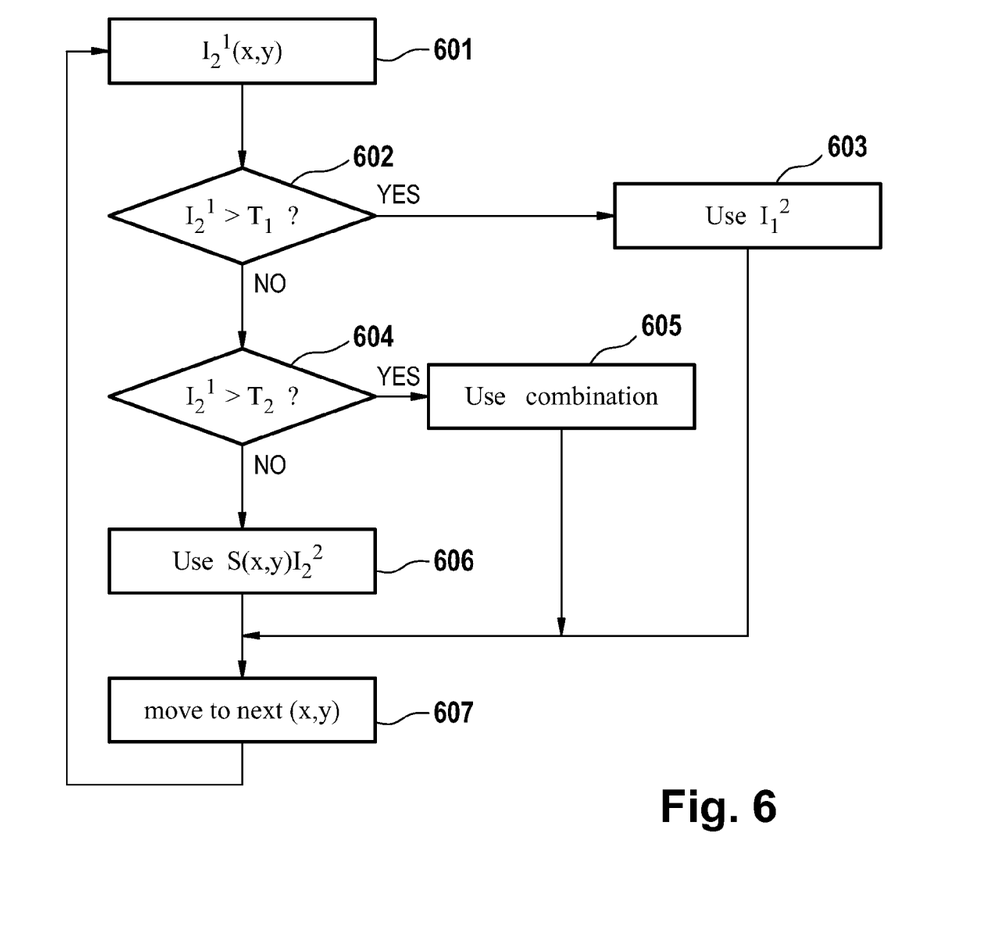
FIG. 6 is a flow diagram illustrating steps involved in an alternative method of selection of high frequency components using comparison of low frequency components according to an embodiment of the present invention.

FIG. 6 shows an alternative method of selection of local high frequency components for the final image by comparing low frequency component of the second image with two thresholds. In step 601, the low frequency component $I_2^1(x,y)$ for a point on the second image is obtained. In step 602, $I_2^1(x,y)$ is compared with a first threshold $T_1$. In areas of the image where the low frequency component is greater than the first threshold $T_1$, the high frequency component of the first image $I_1^2(x,y)$ is selected for the final image (step 603). In these areas the second image is likely to be saturated so the signals are taken from the first image. If the low frequency component of the second image, $I_2^1(x,y)$ is below the first threshold, $I_2^1(x,y)$ is compared with a second threshold $T_2$ in step 604. If $I_2^1(x,y)$ is above this second threshold, then in step 605 a combination of high frequency component from the first and second images is used in the final image. An example of the combination of the high frequency signals where the low frequency component of the second image is between the thresholds is as follows:

$$I_F^2(x,y) = \left(1 - \frac{M_1^2 - T_2}{T_1 - T_2}\right)S(x,y)I_2^2(x,y) + \frac{M_1^2 - T_2}{T_1 - T_2}I_1^2(x,y)$$

Where $I_F^2(x,y)$ is the high frequency content of the final image, $M_1^2$ is a signal level representative of the color channels of the low frequency component of the second image, $T_1$ and $T_2$ are the first and second thresholds, and $S(x,y)$ is the scaling factor. As stated above the scaling factor can be a local scaling factor calculated from the local ratio of the low frequency components of the first and second images or it can be a global scaling factor calculated from the ratio of exposure times. Other formulae for the combination of the high frequency signals can be used.

In step 606, the scaled high frequency components from the second image are selected for the final image. The next point on the image is moved to in step 607, and the process is repeated.

Figure 7:
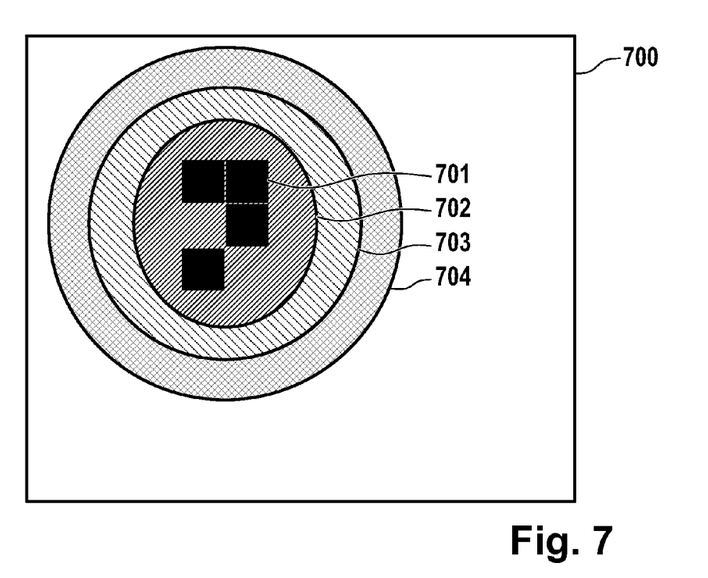
FIG. 7 illustrates a method of defining regions consistent with an embodiment of the present invention.

FIG. 7 shows a further method of selecting high frequency components of the final image. The method involves identifying saturated pixels 701 in the second exposure 700 by comparing the intensities of the pixels with a saturation threshold. Where the intensities of the pixels comprise a number of color channels, the comparison can be for the strongest color channel or for the sum of all the individual color channels. These saturated pixels are then used to define a saturation region 702. The saturation region extends beyond the saturated pixels because the effects of saturation are likely to extend beyond the saturated pixels themselves, as the low frequency value is derived from a physical extent greater than a single pixel. Beyond the saturation region, further regions 703, 704 can be defined such as in the way as shown in FIG. 7. The high frequency components of the final image are selected from the first image, the second image or a combination of the two depending upon the region.

For example when there are three regions, the high frequency components of the final image can be selected as follows:

$$I_F^2(x,y) = I_1^2(x,y) \text{ in region 702}$$

$$I_F^2(x,y) = \frac{2}{3}I_1^2(x,y) + \frac{1}{3}S(x,y)I_2^2(x,y) \text{ in region 703}$$

$$I_F^2(x,y) = \frac{1}{3}I_1^2(x,y) + \frac{2}{3}S(x,y)I_2^2(x,y) \text{ in region 704}$$

$$I_F^2(x,y) = S(x,y)I_2^2(x,y) \text{ outside any region.}$$

In the above formula, $I_F^2(x,y)$ is the high frequency content of the final image, $I_1^2(x,y)$ and $I_2^2(x,y)$ are the high frequency components of the first and second images and $S(x,y)$ is the scaling factor. Further sets of regions can be defined for further areas of saturated pixels. Other ways of calculating the contributions are possible, and a larger number of regions can be used.

Such regions can be defined through the repeated application of the binary image morphology procedure of dilation. The binary image morphology procedure of dilation is known in the prior art (for example in Digital Image Processing, Rafael Gonzales and Richard Woods, Addison-Wesley, 1992. Pages 518-524). The starting binary image is defined by those above the initial threshold. Those pixels that are added by each iteration of the dilation process (using a square or circular structuring element) define first the extended saturated and then each extended region in turn.

Figure 8:
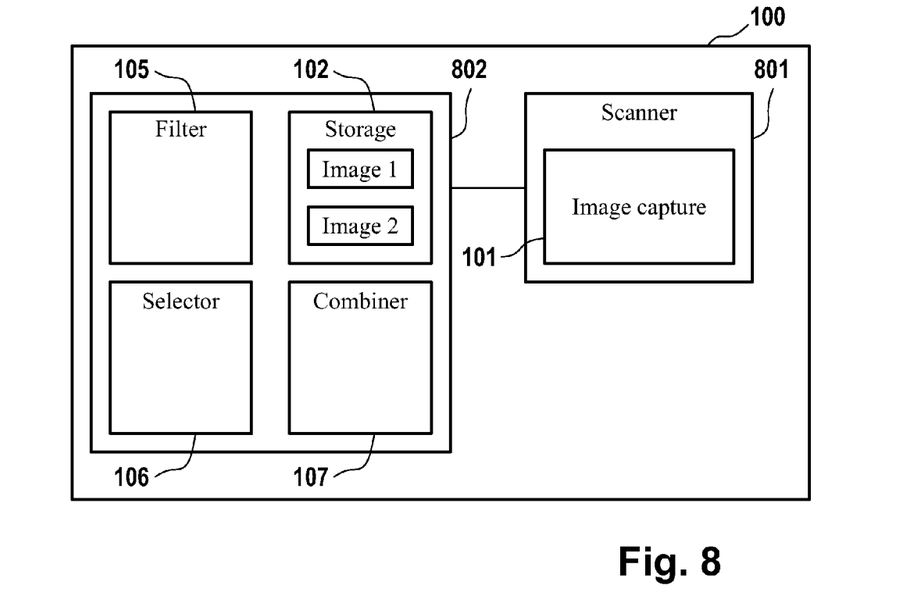
FIG. 8 is a block diagram of an exemplary image processing system consistent with an embodiment of the present invention.

FIG. 8 shows an embodiment the invention, the image processing system 100 comprising a scanner 801 connected to a computer 802. The image capture 101 takes place in the scanner. The storage 102 for the first and second images 103, 104, the filter 105, the selector 106 and the combiner 107 are contained within the computer.

Figure 9:
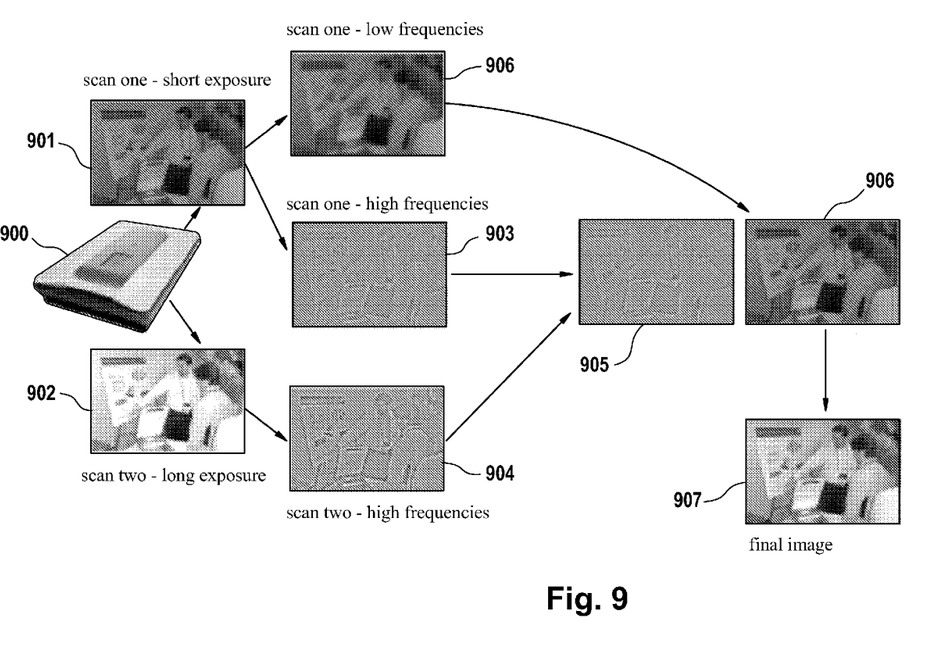
FIG. 9 illustrates a representation of the combination of two images obtained from a scanner consistent with an embodiment of the present invention.

FIG. 9 shows an embodiment of the invention comprising a scanner 900, which captures a short exposure 901 and a long exposure 902 of a photograph or photographic negative. The high frequencies from the two scans 903, 904 are combined to form a final image high frequency component 905. The combined high frequency component 905 is combined with the low frequencies 906 from the first scan to form a final image 907.

List of Reference Numerals

| | |
|---|---|
| 100 | Image processing system |
| 101 | Image capture device |
| 102 | Storage |
| 103 | Image 1 |
| 104 | Image 2 |
| 105 | Filter |
| 106 | Selector |
| 107 | Combiner |
| 201 | Obtain images step |
| 202 | Split into spatial frequencies step |
| 203 | Select components step |
| 204 | Combine components step |
| 300 | Image |
| 301 | Point on image |
| 401 | Calculate difference step |
| 402 | Comparison step |
| 403 | Use high frequency from first image |
| 404 | Use high frequency from second image |
| 405 | Move to next point |
| 501 | Obtain low spatial frequency of first image |
| 502 | Compare with first threshold |
| 503 | Use high frequency from first image |
| 504 | Compare with dark threshold |
| 505 | Use fixed scaling factor |
| 506 | Use high frequency from second image |
| 601 | Obtain low spatial frequency of first image |
| 602 | Compare with first threshold |
| 603 | Use high frequency from first image |
| 604 | Compare with second threshold |
| 605 | Use combination of high frequency components from first and second images |
| 606 | Use scaled high frequency component from second image |
| 607 | Move to next point |
| 700 | Second image |
| 701 | Saturated pixels |
| 702 | Saturation region |
| 703 | Region |
| 704 | Region |

-continued

List of Reference Numerals

| | |
|---|---|
| 801 | Scanner |
| 802 | Computer |
| 900 | Scanner |
| 901 | Short exposure |
| 902 | Long exposure |
| 903 | Short exposure high frequencies |
| 904 | Long exposure high frequencies |
| 905 | Combined high frequencies |
| 906 | Short exposure low frequencies |
| 907 | Final image |

The invention claimed is:

1. An image processing system comprising:
an image capture device that captures at least first and second images of an object at different exposures;
storage for at least part of the at least first and second images,
a filter for splitting the at least first and second images into respective first and second spatial frequency components, the first frequency component being of lower frequency than the second;
a selector for selecting local image intensity data from the second spatial frequency components of a region of the at least first and second images for combination with the first frequency component from the corresponding region of the first image; and
a combiner for combining the selected local image data from the second spatial frequency components of the at least first and second images with the first spatial frequency component of the first image to form a final image.

2. The image processing system of claim 1, the filtering component comprising:
a Gaussian filter; and
means for subtracting the output of the Gaussian filter from the first or second image.

3. The image processing system of claim 1, the selector comprising:
means for comparison of a local image intensity measure of a region of the second image with a first threshold, wherein the selector selects the local second spatial frequency component of the second image from the region of the second image for inclusion in the corresponding region of the final image if the local image intensity measure of the second image is below the said first threshold.

4. The image processing system of claim 3, the image capture device having a number of colour channels for capturing colour intensity data, and the local image intensity measure being the local image intensity data of the colour channel having the highest intensity.

5. The image processing system of claim 3, wherein:
the image capture device has a number of colour channels for capturing colour intensity data;
the selector is adapted to compare the local intensity data of a colour channel with the first threshold; and
the selector is further adapted to select the local second spatial frequency component of the colour channel of the, second image from the region of the second image for inclusion in the corresponding region of the final image if the local image intensity measure of the second image is below the said first threshold.

6. The image processing system of claim 3, the selector further comprising:

means for comparing the local image intensity measure of the region of the second image with a second threshold, the second threshold being below the first threshold, wherein the selector selects the local second spatial frequency for inclusion in the corresponding region of the final image from the first image if the local image intensity measure of the second image is above the first threshold, from the second image if the local image intensity measure of the second image is below the second threshold and, from a combination of local second frequency components from the first and second images if the local image intensity measure of the second image is between the first and second thresholds.

7. The image processing system of claim 3, the selector further comprising:

means for defining a saturation region of the image where the local image intensity measure is greater than the first threshold; and means for extending a saturation region, wherein the selector selects the second spatial frequency for the final image from the first image within a saturation region, and from the second image outside a saturation region.

8. The image processing system of claim 3, the selector further comprising:

means for defining a saturation region of the image where the local image intensity measure is greater than the first threshold; and means to define at least one region surrounding a saturation region of the image, wherein the selector selects the second spatial frequency for the final image from the first image within a saturation region, from a combination of the first and second images in a region surrounding a saturation region, and from the second image outside either a saturation region or a region surrounding a saturation region.

9. The image processing system of claim 1, the combination component comprising:

means for calculating a scaling factor, the said scaling factor being the ratio of the first spatial frequency component of the first image and the first spatial frequency component of the second image; and means for multiplying the second spatial frequency component from the second image by the scaling factor.

10. The image processing system of claim 1, the first and second images having first and second exposure variables, and the combination component comprising:

means for calculating a scaling factor, the said scaling factor being the ratio of the first and second exposure variables; and, means for multiplying the second spatial frequency component from the second image by the scaling factor.

11. The image processing system of claim 9, further comprising means to compare the second frequency component of the second image with a third threshold and means to select a fixed scaling factor if the second frequency component of the second image is below the third threshold.

12. The image processing system of claim 9, further comprising means to compare the second frequency component of the second image with a third threshold and means to select the second frequency component from the first image if the second frequency component of the second image is below the third threshold.

13. The image processing system of claim 1, the image capture device comprising a scanner.

14. A method of combining at least first and second differently exposed images of an object to form a final image, the first image having a shorter exposure time than the second, the method comprising:

splitting the differently exposed images into first and second spatial frequency components, the first spatial frequency component having a lower spatial frequency than the second;

selecting local second spatial frequency components from the at least first and second images for combination with the first spatial frequency components of the first image; and combining the selected local second spatial frequency components with the local first spatial frequency components of the first image to form a final image.

15. The method of claim 14, further comprising:

selecting the second spatial frequency component of the final image using local properties of the first spatial frequency component of the second image.

16. The method of claim 14, the combination of the selected components comprising:

multiplying the local second spatial frequency component of the second image by a scaling factor to obtain a scaled second spatial frequency component.

17. The method of claim 16, further comprising:

selecting the local second spatial frequency component of a region of the final image by comparing the local second spatial frequency components of a region of the first image with the scaled second spatial frequency component of the second image;

selecting the second spatial frequency component from the second image if the difference is below a predefined value; and selecting the second spatial frequency component of the first image if the difference is above a predefined value.

18. A computer implemented method for combining differently exposed images of the same object, the method comprising:

to splitting the images into first and second spatial frequency components wherein first and second spatial frequency are different;

selecting local second spatial frequency components from the differently exposed images for combination with the first spatial frequency components of one of the differently exposed images; and combining the selected second spatial frequency components with the first spatial frequency components of the first image to form a final image.

19. The computer implemented method of claim 18, further comprising:

acquiring from an image capture device at least two differently exposed images of the same object.

20. The computer implemented method of claim 18, further comprising:

acquiring from a scanner at least two differently exposed images of the same object.

* * * * *

UNITED STATES PATENT AND TRADEMARK OFFICE
CERTIFICATE OF CORRECTION

| | | |
|---|---|---|
| PATENT NO. | : 7,949,182 B2 | Page 1 of 1 |
| APPLICATION NO. | : 11/627305 | |
| DATED | : May 24, 2011 | |
| INVENTOR(S) | : Stephen Pollard et al. | |

It is certified that error appears in the above-identified patent and that said Letters Patent is hereby corrected as shown below:

In column 8, line 62, in Claim 5, delete "the," and insert -- the --, therefor.

In column 10, line 44, in Claim 18, before "splitting" delete "to".

Signed and Sealed this
Twentieth Day of March, 2012

David J. Kappos
*Director of the United States Patent and Trademark Office*